United States Patent
Frazier et al.

(10) Patent No.: US 9,524,205 B1
(45) Date of Patent: Dec. 20, 2016

(54) CODE FINGERPRINT-BASED PROCESSOR MALFUNCTION DETECTION

(71) Applicant: International Business Machines Corporation, Armonk, NY (US)

(72) Inventors: Giles R. Frazier, Austin, TX (US); Michael Karl Gschwind, Chappaqua, NY (US); Christian Jacobi, Poughkeepsie, NY (US); Anthony Saporito, Highland, NY (US); Chung-Lung K. Shum, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/987,395

(22) Filed: Jan. 4, 2016

(51) Int. Cl.
*G06F 11/00* (2006.01)
*G06F 11/07* (2006.01)
*G06F 9/30* (2006.01)

(52) U.S. Cl.
CPC ......... *G06F 11/079* (2013.01); *G06F 9/30098* (2013.01); *G06F 11/0721* (2013.01)

(58) Field of Classification Search
CPC . G06F 11/0778; G06F 11/079; G06F 11/3648; G06F 11/3466
USPC .......................................................... 714/37
See application file for complete search history.

(56) References Cited

U.S. PATENT DOCUMENTS

| 6,360,336 B1 | 3/2002 | Christensen et al. |
| 7,096,347 B2 | 8/2006 | Moore |
| 7,206,969 B2 * | 4/2007 | Shidla ................... G06F 11/263 714/30 |
| 7,584,405 B2 | 9/2009 | Osecky et al. |
| 8,090,984 B2 | 1/2012 | Moyer et al. |
| 2012/0324557 A1 * | 12/2012 | Rubin ..................... G06F 21/50 726/7 |
| 2013/0246771 A1 * | 9/2013 | Farrell ................... G06F 9/3005 712/227 |

(Continued)

FOREIGN PATENT DOCUMENTS

EP 1916794 A2 4/2008

OTHER PUBLICATIONS

Giles R. Frazier, et al., "Configurable Code Fingerprint," U.S. Appl. No. 14/987,220, filed Jan. 4, 2016.

(Continued)

*Primary Examiner* — Amine Riad
(74) *Attorney, Agent, or Firm* — Cantor Colburn LLP; William A. Kinnaman, Jr.

(57) ABSTRACT

Techniques relate to fingerprint-based processor malfunction detection. A determination is made whether a fingerprint is present in software that is currently executing on the processor of the computer system. The fingerprint includes a representation of a sequence of behavior that occurs on the processor while the software is executing. The fingerprint corresponds to a type of malfunction. In response to determining that the fingerprint is not present in the software currently executing on the processor, monitoring of the software executing on the processor to determine whether the fingerprint is present continues. In response to determining that the fingerprint is present in the software executing on the processor, it is determined that the malfunction has occurred according to a type of the fingerprint that is present.

17 Claims, 7 Drawing Sheets

(56) References Cited

U.S. PATENT DOCUMENTS

2013/0333033 A1* 12/2013 Khesin ................. G06F 21/566
726/23

OTHER PUBLICATIONS

Giles R. Frazier, et al., "Programmable Code Fingerprint," U.S. Appl. No. 14/987,263, filed Jan. 4, 2016.
Giles R. Frazier, et al.,"Automated Compiler Operation Verification," U.S. Appl. No. 14/987,400, filed Jan. 4, 2016.
Giles R. Frazier, et al.,"Scheme for Verifying the Effects of Program Optimizations," U.S. Appl. No. 14/987,377, filed Jan. 4, 2016.
IBM, "Power ISA V 2.07B," Power.org, Book II, Apr. 9, 2015, pp. 733-838.
IBM, "Power ISA V 2.07B," Power.org, Book III-S, Apr. 9, 2015, pp. 839-1020.
Jonathan D. Bradbury, et al.,"Behavior Based Code Recompilation Triggering Scheme," U.S. Appl. No. 14/987,346, filed Jan. 4, 2016.
List of IBM Patents or Patent Applications Treated as Related; Date Filed: Jan. 4, 2016, pp. 1-2.
M. Hatzimihail, et al.,"A Methodology for Detecting Performance Faults in Microprocessors via Performance Monitoring Hardware", International Test Conference, IEEE, Oct. 21-26, 2007, pp. 1-10.

* cited by examiner

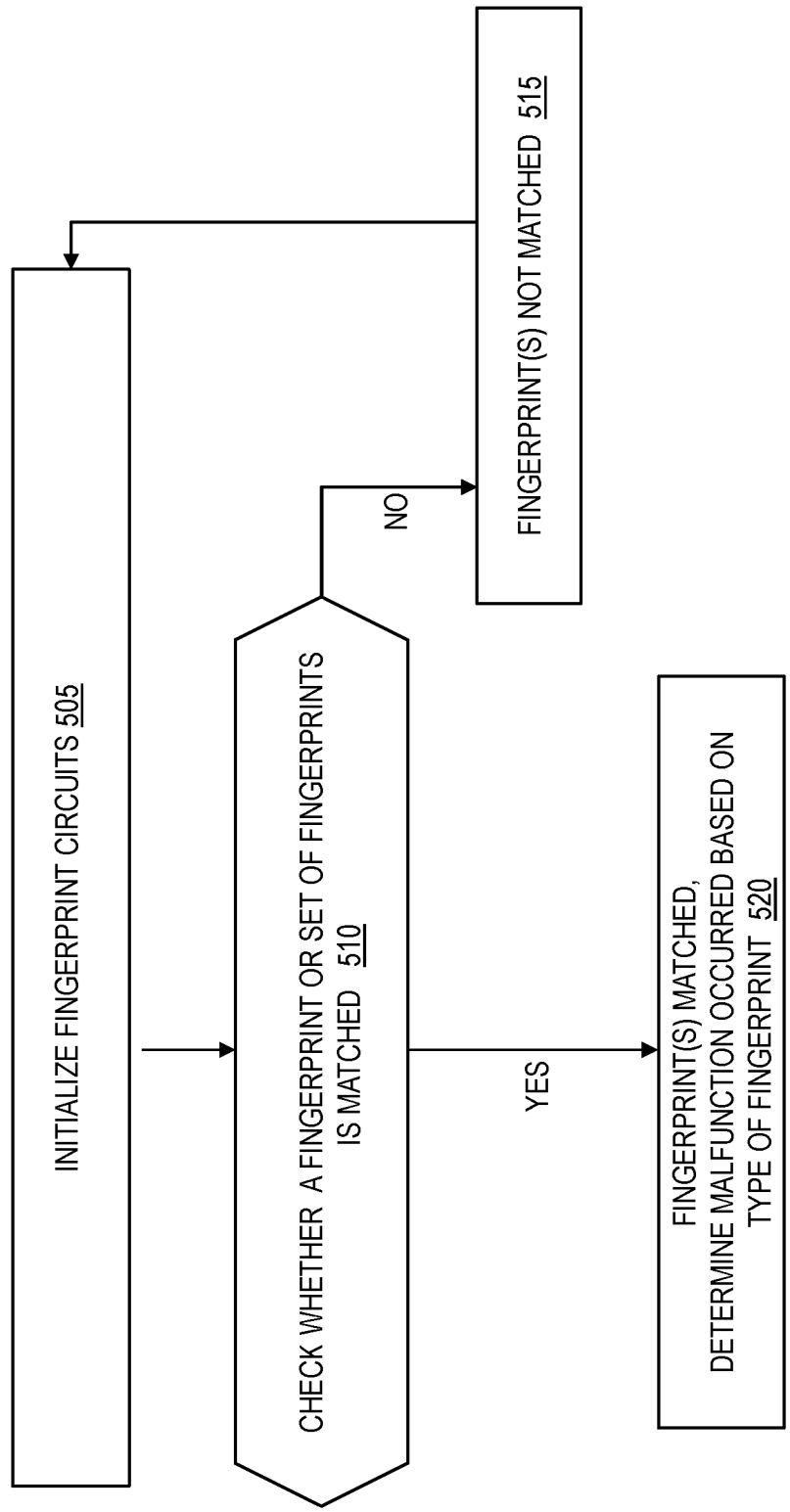

CODE FINGERPRINT-BASED PROCESSOR MALFUNCTION DETECTION

BACKGROUND

The present invention relates generally to computer processors, and more specifically, to code fingerprint-based processor malfunction detection.

Computers may have problems now and then. Even the most stable, secure machine is not safe from failing hardware, or disruptions caused by transient external events. The computer malfunctions that result when these disruptions occur may include significant degradations in cache prefetch accuracy and branch prediction accuracy, execution of software paths that are not intended to be followed, and many others.

SUMMARY

Embodiments include a method, system, and computer program product for fingerprint-based processor malfunction detection. A determination is made whether a fingerprint is present in software that is currently executing on the processor of the computer system. The fingerprint includes a representation of a sequence of behavior that occurs on the processor while the software is executing, where the fingerprint corresponds to a type of malfunction. In response to determining that the fingerprint is not present in the software currently executing on the processor, monitoring of the software executing on the processor to determine whether the fingerprint is present continues. In response to determining that the fingerprint is present in the software executing on the processor, it is determined that the malfunction has occurred according to a type of the fingerprint that is present.

BRIEF DESCRIPTION OF THE DRAWINGS

FIG. 5 depicts a flow chart of fingerprint-based processor malfunction detection in accordance with an embodiment.

DETAILED DESCRIPTION

Since relatively harmless malfunctions can cascade into major failures, embodiments are configured to immediately alert software when such malfunctions occur so that corrective action can be taken before serious damage results.

In a computing system, it is usually desirable to monitor the system periodically to ensure that it is operating within a given set of bounds or within an expected operating range. Typical parameters that are monitored include utilization, instruction completion rate, average transaction response time, and other similar rate-based measurements. Such overall measurements, however, are not detailed enough to recognize intermittent problems that do not significantly affect averages, and such overall measurements usually do not provide enough information about a problem in order to enable a run-time compiler to determine an appropriate corrective action.

State-of-the-art processors include performance monitors that are used by run-time compilers to monitor program behavior. Such performance monitors provide configurable counters that can be used to count various events related to cache behavior, branch prediction behaviors, completion rates, etc. A runtime compiler might monitor such counters when a program executes in order to ensure the various event rates are within normal bounds, but when one of the events deviates from its expected range, no additional information is immediately available to direct any corrective action. This results in the need for additional analysis such as determining the rate of occurrence of other events, or determining event rates on many small sections of the code in order to determine the point at which the event rate deviation is occurring. Such measurements are time consuming, and the measurements involve timeouts for counts to accumulate, counter re-initializations, and other compute-intensive operations.

Embodiments address this problem by monitoring the value of one or more code fingerprints as execution proceeds. When one of these fingerprints deviates from its expected range of values or when its value closely approximates a fingerprint previously known to be indicative of a malfunction, a fingerprint circuit immediately recognizes that a problem exists, and the problem is related to the type of fingerprint that is out of range or otherwise indicative of a particular malfunction. This detailed information about the exact location in the code at which a particular type of problem occurred is very useful since it pinpoints the cause of the problem much more rapidly and efficiently than existing methods.

Figure 1:
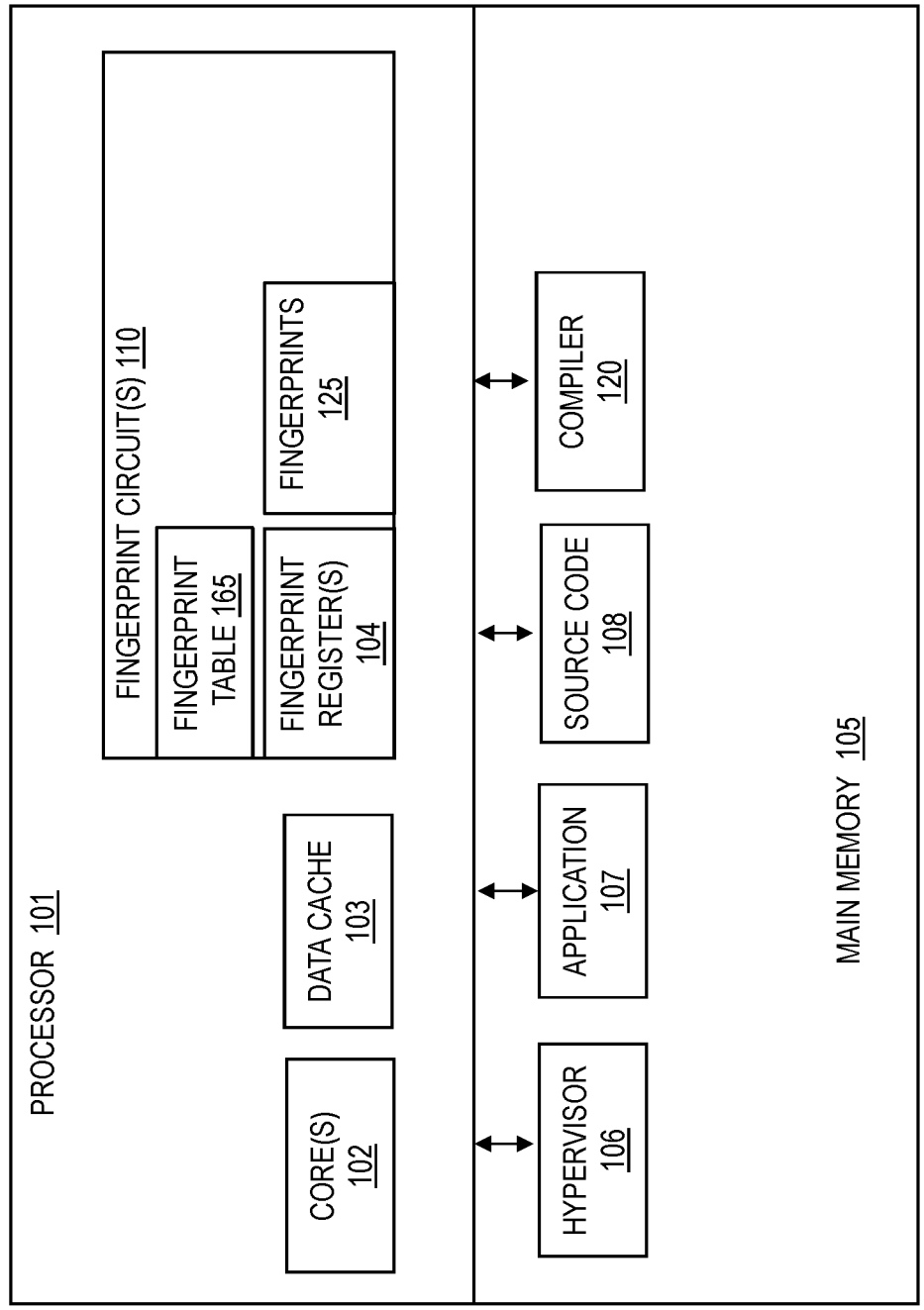
FIG. 1 depicts a computer system for implementing fingerprint-based processor malfunction detection in accordance with an embodiment.

Now turning to the figures, FIG. 1 depicts a computer system 100 configured to implement fingerprint-based processor malfunction detection in accordance with an embodiment. The computer system 100 includes a processor 101 in communication with a main memory 105. The processor 101 includes one or more cores 102 that execute instructions using cache memory 103. Computer programs, such as hypervisor 106, application 107, and source code 108, are stored in main memory 105 and executed by the processor 101. Any appropriate number of applications may be executed by a computer system such as computer system 100. The computer system 100 may also include source code 108 that may be compiled by a compiler 120 for execution on the processor 101. The hypervisor 106, application 107, source code 108, and/or any other program stored in main memory 105 may all be considered software programs, software, code, etc.

The processor 101 includes one or more fingerprint circuits 110 designed to monitor the execution of software programs (e.g., application 107, hypervisor 106, source code 108) on the processor 101. The fingerprint circuit 110 includes predefined/specified code fingerprints 125. The fingerprint circuit 110 is configured to automatically monitor the software program execution of, e.g., the application 107, in order to recognize the occurrence of a specified fingerprint 125 which indicates a potential malfunction. The fingerprint circuit 110 is also configured to alert the application program 107 at that point (i.e., the segment of code) at which the fingerprint 125 that indicated the malfunction is recognized by means of an Event-Based Branch (EBB), also referred to as a "lightweight interrupt." The software program is therefore able to immediately analyze the code and state of the processor at the point at which the malfunction occurred and rapidly take the necessary corrective action.

Various counters and modules may be utilized to count incoming events and compare against a predefined number of events to determine when a fingerprint is recognized. The system 100 depicted in FIG. 1 may include a fingerprint recognition function in the fingerprint circuit 110 according to an embodiment for which fingerprints 125 consist of event rates. Examples of such event-rate fingerprints may include a data cache prefetch miss rate fingerprint 125, a branch miss rate fingerprint 125, and/or a branch target miss rate fingerprint 125. It is appreciated that other fingerprints may also be included in the hardware of the fingerprint circuits 110.

The fingerprint circuit 110 may comprise one or more fingerprint shift registers 104 in some embodiments, and the fingerprint shift register 104 is used to determine the fingerprint 125 of the software code that is currently executing. Also, the fingerprint circuit 110 includes logic circuits to function as discussed herein. In one implementation, the fingerprint circuit 110 may also include firmware, microcode, etc., to execute the functions discussed herein.

In one implementation, the fingerprint circuit 110 may monitor execution of the software program 107 in order to determine a match to a single specified fingerprint 125. In response to finding the match, the fingerprint circuit 110 is configured to issue a lightweight interrupt to the application 107 indicating that a malfunction has occurred so that it may immediately take corrective action.

In another implementation, the fingerprint circuit 110 may monitor execution of the software program 107 in order to determine a match to a combination (set) of specified fingerprints 125, such as two or more different specified fingerprints 125. In response to finding the match to the combination of specified fingerprints 125 (e.g., two or more different specified fingerprints 125), the fingerprint circuit 110 is configured to issue a lightweight interrupt to the application indicating that the specified combination of fingerprints has been recognized so that the application may immediately take corrective action.

For illustration purposes and not limitation, a few examples of code fingerprints 125 are discussed.

1) One code fingerprint 125 may be a data cache hit miss sequence. For example, the data cache hit and miss sequence may be [hit, hit, miss, miss, hit, miss, miss] for one code fingerprint 125. This same data cache hit and miss sequence may be represented by [1100100] in the fingerprint shift register 104, where '1' represents a hit and '0' represents a miss. In one implementation, the fingerprint register 104 may store the actual output of the software program 107 currently executing on the processor 101, such that the fingerprint circuit 110 can check the fingerprint shift register 104 at any time and recognize when the output of the software program 107 in the fingerprint shift register 104 matches the data cache hit miss sequence of the fingerprint 125.

2) Another code fingerprint 125 may be a data cache hit miss sequence that is present when a given instruction is executed. The given instruction may have a predefined address (XYZ). As noted above for illustration purposes, the data cache hit miss sequence may be the sequence of cache hits and misses [hit, hit, miss, miss, hit, miss, miss] that occurred in load instructions leading up to the instruction at address XYZ. In this case, the fingerprint circuit 110 waits for execution of the given instruction of the software program 107 and only checks the fingerprint register 104 at the time when the given instruction (with address XYZ) executes.

3) A code fingerprint 125 may be branch prediction hit miss sequence for a specific set of branches identified by an instruction prefix. In such an embodiment, branch instructions have an operand that identifies whether or not they are to be used in the fingerprint. When a branch with an operand indicating that it is part of the fingerprint is executed, either a 1 or a 0 is shifted into a shift register, depending on whether the prediction was a correct prediction or misprediction.

4) Another code fingerprint 125 may be a branch history value when a given instruction is executed. In such an embodiment, the fingerprint consists of a sequence of 0's and 1's, where 1 means the branch was taken, and 0 means the branch was not taken. When a branch instruction is executed, either a 1 or a 0 is shifted into a shift register, depending on whether the branch was taken or not taken.

5) A code fingerprint 125 may be a call signature at a given instruction, where the call signature is a binary value that is a function of the sequence of call and return instructions that have previously been executed when an instruction is executed.

6) Another code fingerprint 125 may be the value of come from address register (CFAR) of the processor 101 at a given instruction, where the CFAR contains the address of the most-recently executed branch instruction that was taken.

7) There may also be code fingerprints 125 that consist of a set of average performance metrics that are all present at a certain point in the program. The set of average performance metrics may include metrics such as average data cache hit rate, average branch direction hit rate, average branch target hit rate, rate of taken branches, percent instructions of a certain type, etc.

In embodiments, it should be appreciated that the fingerprint circuit 110 provides the ability to specify a particular fingerprint 125, and to continuously monitor execution of a software program while checking if that fingerprint 125 is recognized. Upon recognition of the fingerprint 125, the fingerprint circuit 110 immediately issues a lightweight interrupt so that the application can immediately take corrective action.

Figure 2:
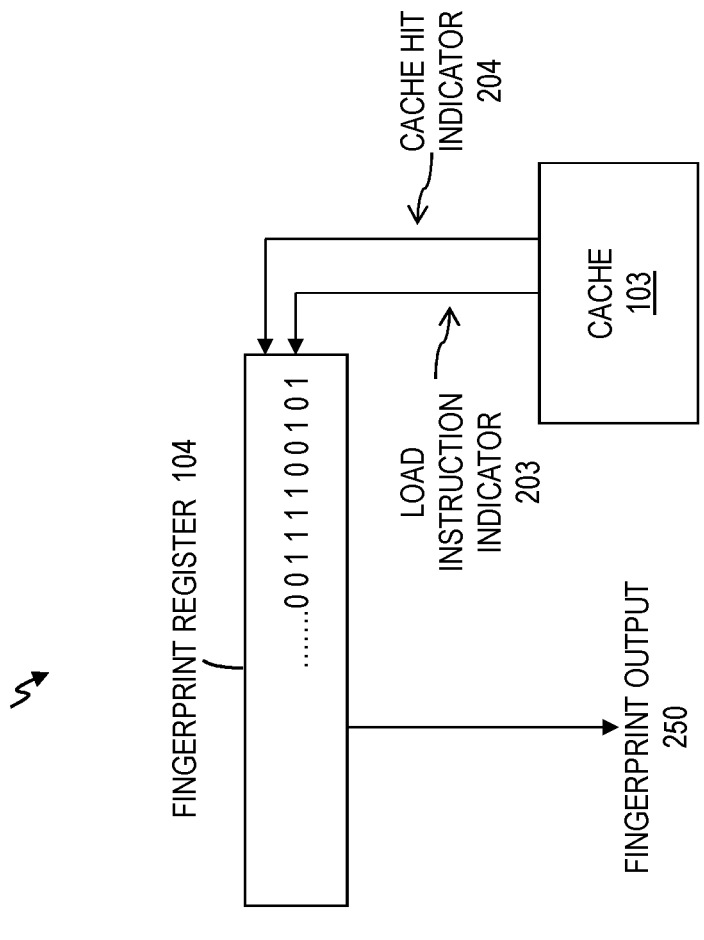
FIG. 2 depicts a fingerprint recognition function of a fingerprint circuit in accordance with an embodiment.

FIG. 2 depicts a fingerprint recognition function/detector of the fingerprint circuit 110 according to an embodiment. A fingerprint recognition function/detector may include hardware that detects, e.g., a specific sequence of load instruction data cache hits and misses in the shift register. This shift register is referred to as a fingerprint register 104 in the processor 101, since the contents of the fingerprint register 104 represent the actual execution output of the processor 101 (actual fingerprint), which is in this case the sequence of the most-recent data cache hits and misses. Such a fingerprint register 104 may be of arbitrary length. In one implementation, either 32 or 64 bits may be suitable for the fingerprint register 104.

In FIG. 2, the sequence of 1's and 0's in the fingerprint register 104 may represent the most-recent history of load instruction data cache hits and misses, where a '0' indicates a data cache miss and a '1' indicates a data cache hit. Alternatively, fingerprint register 104 may represent the most-recent history of data cache hits and misses, where a '0' indicates a data cache miss and a '1' indicates a data cache hit. An implementation may have one of these fingerprint registers 104 for each level of the cache. As shown in FIG. 2, fingerprint register 104 (that detects branch taken and not taken sequences) receives input from a cache 103

(and/or from main memory 105) via load instruction indicator 203 and cache hit indicator 204. Whenever load instruction indicator 203 indicates a load instruction, a '1' is input into the fingerprint shift register 104 if the instruction results in a cache hit, and a '0' is loaded into the fingerprint shift register 104 when the instruction results in a cache miss (i.e., a load instruction with no cache hit). An observed fingerprint is output on fingerprint output 250; the observed fingerprint gives a snapshot of the cache hit/miss behavior of the current workload and may be used to identify the recent cache hit/miss behavior of load instructions in the workload. The fingerprint register 104 may be of any appropriate size, and the observed fingerprint that is output on fingerprint output 250 may be the entire contents of the fingerprint register 104 in some embodiments. FIG. 2 is shown for illustrative purposes only; a fingerprint module comprising a shift register may measure any aspect of processor performance in various embodiments such as branch prediction hits and misses, branches taken and not taken, etc., where a 1 represents a correctly predicted or taken branch and a 0 represents a mispredicted or not taken branch, respectively. The fingerprint register 104 may also consist of a sequence of multiple registers instead of the single register 104. For example, it may consist of the most-recent n values of a CFAR or of a call signature register.

In some embodiments, the fingerprint circuit 110 may poll such a fingerprint register 104 upon entry to a method or at a function call, and a malfunction is recognized if the value of the actual fingerprint in the fingerprint register 104 is well outside the value of a specified fingerprint 125 that is expected to be present in normal operation, or that approximates the expected value of a fingerprint previously known to exist when a particular malfunction function occurs.

Figure 3:
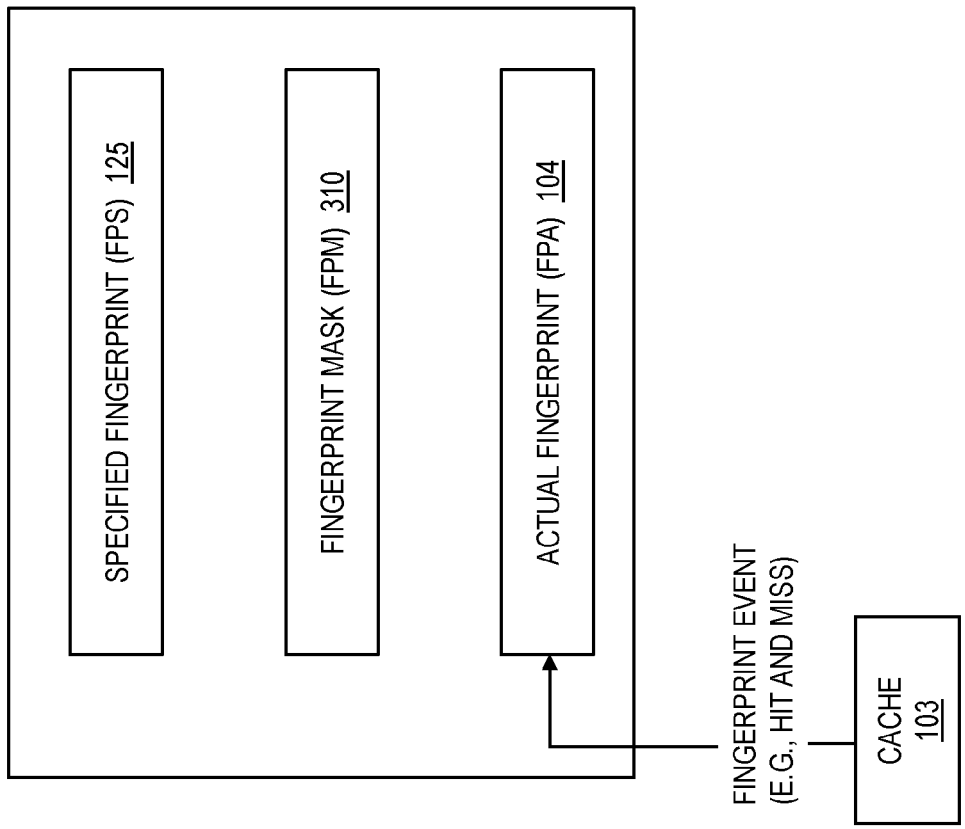
FIG. 3 depicts a fingerprint recognition function of the fingerprint circuit in accordance with an embodiment.
Figure 6A:
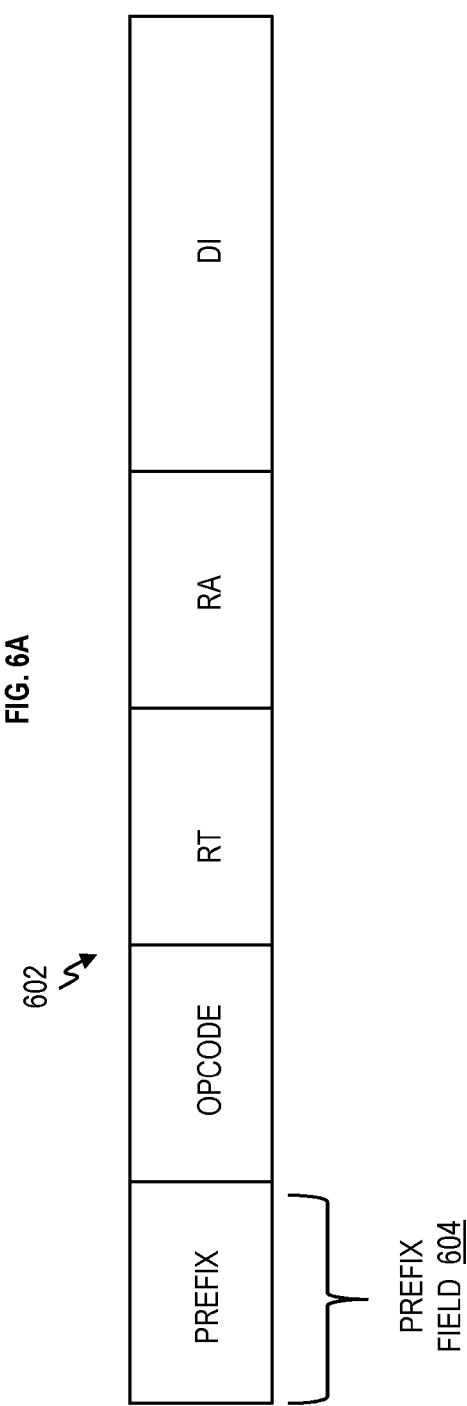
FIG. 6A depicts an instruction with an example prefix field for a prefix according to an embodiment.
Figure 6B:
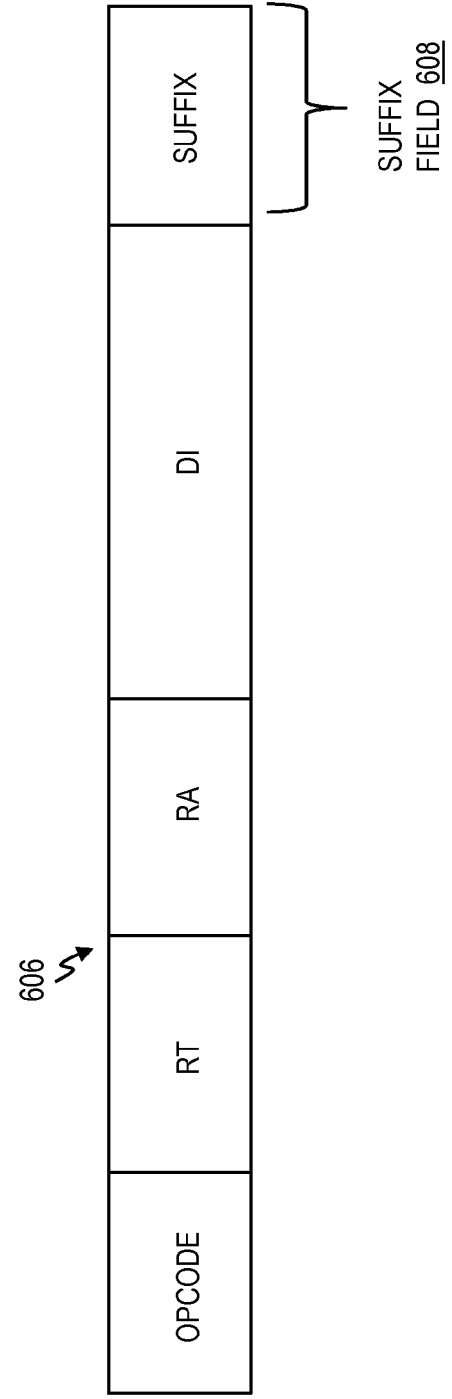
FIG. 6B depicts an instruction with an example suffix field for a suffix according to an embodiment.

FIG. 3 depicts a fingerprint recognition function/detector of the fingerprint circuit 110 according to an embodiment. The fingerprint circuit 110 is configured to automatically detect an arbitrary sequence of events leading up to a specific instruction. The instruction at which to sample the fingerprint register 104 may be identified by an instruction prefix or suffix, where the prefix or suffix consists of an additional field either at the beginning or end of the instruction image (i.e., the instruction). FIG. 6A depicts an instruction 602 with an example prefix field 604 for a prefix (e.g., XYZ), and FIG. 6B depicts an instruction 606 with an example suffix field 608 for a suffix (e.g., JKL), according to an embodiment. In FIGS. 6A and 6B, the prefix and suffix may be bits added to the beginning or end of the instruction images 602, 606. Most instructions have an opcode field and one or more operand fields. In the example instructions 602, 606, the instruction opcode is in the OPCODE field opcode, the destination register number (#) is in the RT field, and the source register number (#) is in the RA field, and the DI field is an input variable. The prefix field 604 is an additional field added before the instruction image, while the suffix field 608 is an additional field appended to the end of the instruction image to indicate that the instruction has a suffix field 608. The prefix field 604 and the suffix field 608 can be set to a value to indicate either that the behavior of the instruction is to be included in the generation of the fingerprint 125 and/or to indicate that the fingerprint 125 is to be sampled at that instruction.

Additionally, a special form of no operation (nop) instruction may be used to identify the instruction at which to sample the fingerprint.

In FIG. 3, the fingerprint circuit 110 may include a specified fingerprint 125 that is being monitored for and an actual fingerprint (FPA) in the fingerprint shift register 104 that receives the output of the processor 101 (e.g., from the cache 103 in this example) for the software program (e.g., software application 107). As execution proceeds, the actual sequence of fingerprint events (e.g., load hits and load misses) is shifted into the actual fingerprint register 104. The bits of the actual/observed fingerprint in the actual fingerprint register 104 are compared against the specified fingerprint (FPS) 125 to find a match. When a match is found, the fingerprint circuit 110 determines that a malfunction is recognized, and a lightweight interrupt such as an event based branch (EBB) occurs. The EBB handler can then take the corresponding corrective action. When no match is found, the execution continues uninterrupted.

Optionally, a fingerprint mask register (FPM) 310 may be included, and the fingerprint mask register 310 is configured to turn off certain bits when comparing against the fingerprint register 104. For example, the fingerprint circuit 110 may compare every other bit of the actual fingerprint in the fingerprint register 104 against the specified fingerprint 125 based on the mask of the fingerprint mask register 310.

An example scenario is provided below for explanation purposes. In the fingerprint circuit 110, detection may be initiated with a function such as the DETECT function below. In DETECT (FPS, FPM), the specified fingerprint 125 is the expected cache hit/miss sequence, where a 0 corresponds to a miss and a 1 corresponds to a cache hit. The fingerprint mask register 310 is a bit-for-bit mask on the specified fingerprint register 104. The actual fingerprint being monitored (e.g., sequence of load hit misses or other sequence of events) is loaded into the actual fingerprint register 104 during execution of the software on the processor 101. A mask on the specified fingerprint is loaded into the fingerprint mask (FPM) register 310 in order to skip selected load instructions or shorten the specified fingerprint 125 to less than the register length. As execution proceeds, the actual sequence of fingerprint events (load hits/misses, etc.) is shifted into the actual fingerprint register 104. Each bit of the actual fingerprint register 104 and specified fingerprint shift register 104 are continuously monitored over the fingerprint mask of the fingerprint mask register 310 (when utilized) in one implementation. In another implementation, the fingerprint shift register 104 begins monitoring (only) upon execution of certain instructions such as instructions containing a prefix and/or suffix as explained earlier. When the actual fingerprint in fingerprint register 104 is equal to the expected fingerprint 125 over the mask, the expected fingerprint 125 has been recognized and a malfunction is determined to be present.

An embodiment may contain multiple sets of fingerprint functions/detectors, such as one set of data cache hit and miss functions/detectors for each cache level, another set of fingerprint functions/detectors for sequences of branch direction hits and misses, and a set functions/detectors of branch target hits and misses, a set of fingerprint functions/detectors for sequences of branch instructions taken and not/taken, etc.

Figure 7:
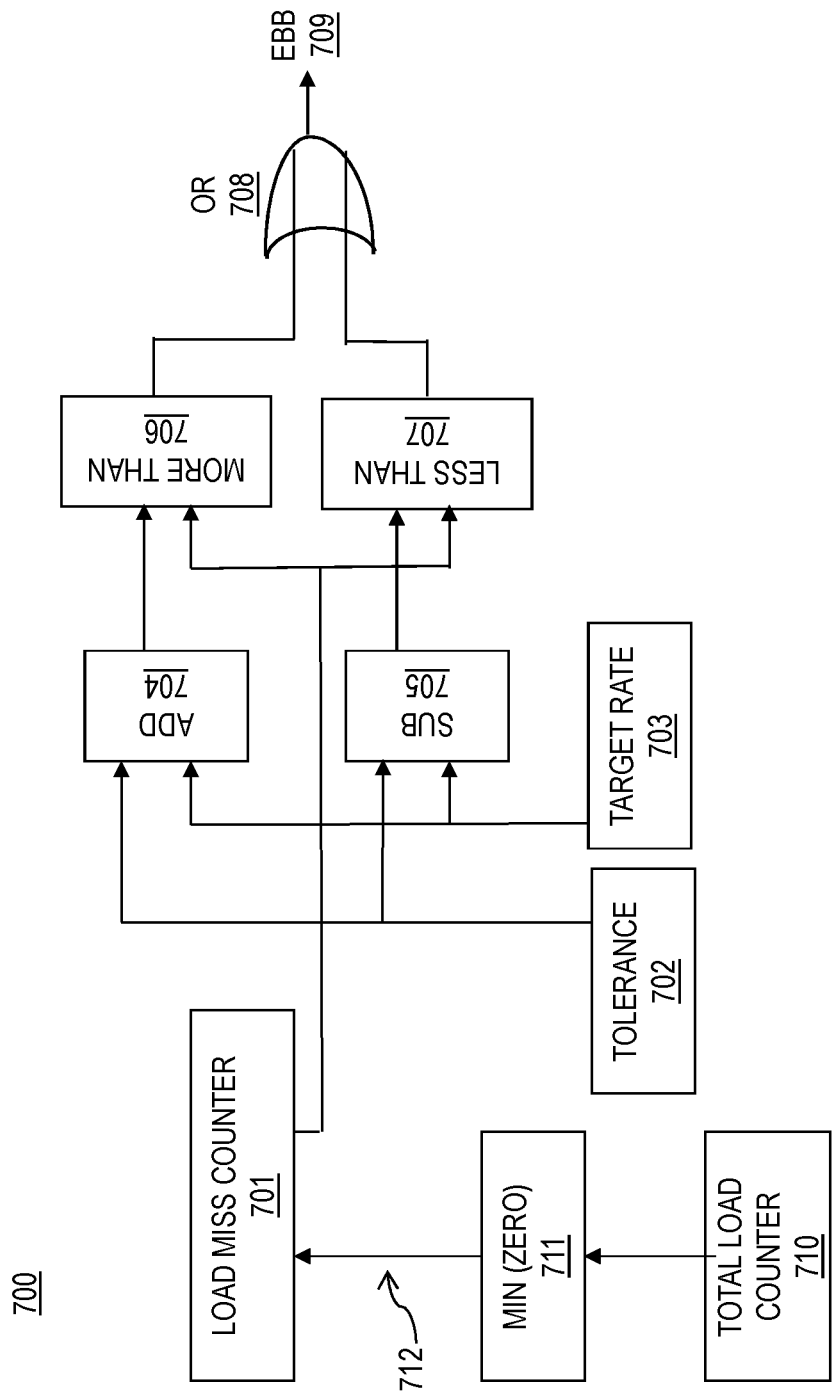
FIG. 7 depicts an event rate fingerprint malfunction detector according to an embodiment.

FIG. 7 depicts an embodiment of an event rate fingerprint malfunction detector 700, which is included in the fingerprint circuit 110 in FIG. 1, that detects malfunctions based when a data cache hit rate is within a given range. Event rate fingerprint malfunction detector 700 comprises a load miss counter 701 that counts load misses that occur in cache 103 of processor 101. The event rate fingerprint malfunction detector is initialized with a target load miss rate 703, and a tolerance 702 that gives a range of acceptable load miss rates. Adder 704 adds the tolerance 702 to the value of the load miss counter 701, and outputs the sum to less than determination module 707. Subtractor 705 subtracts the tolerance 702 from the value of the load miss counter 701, and outputs the difference to more than determination module 706. Less than determination module 707 and more than determination module 706 determine whether the load miss counter 701 is within the tolerance 702 of the target load miss rate 703. If it is determined by less than determination module 707 that the load miss counter 701 plus the tolerance 702 is less than the target load miss rate 703 (i.e., is significantly below the normal range), or if it is determined by more than determination module 706 that the load miss counter 701 minus the tolerance 702 is more than the target load miss rate 703 (i.e., significantly above the normal range), then OR gate 708 outputs a signal, and a fingerprint indicating a malfunction is recognized. The signal from OR gate 708, gated by the output of AND gate 712 when the total load counter 910 reaches its maximum value (e.g. all "1"s) as indicated by MAX indicator 713, causes an EBB, which transfers control to an EBB handler that takes necessary corrective action in response to the malfunction that was detected. The interval over which the load miss rate is determined is based on receipt of wrap indicator 712, which is output from minimum value indicator 711 whenever the total load counter 710 reaches its minimum value (i.e. zero). For example, the total load counter 710 may be an 8-bit counter that wraps every 256 load instructions, in which case the target load miss rate 703 and tolerance 702 may be specified in terms of load instruction prefetch misses per 256 load instructions. Total load counter 710 also resets load miss counter 701 via wrap indicator 712 whenever the total load counter 710 reaches its minimum value (i.e. zero), as detected by minimum value indicator 711. FIG. 7 is shown for illustrative purposes only; an event rate fingerprint malfunction detector such as is shown in FIG. 7 may monitor any appropriate processor parameter and may, in some embodiments, simultaneously monitor multiple processor parameters.

Figure 4:
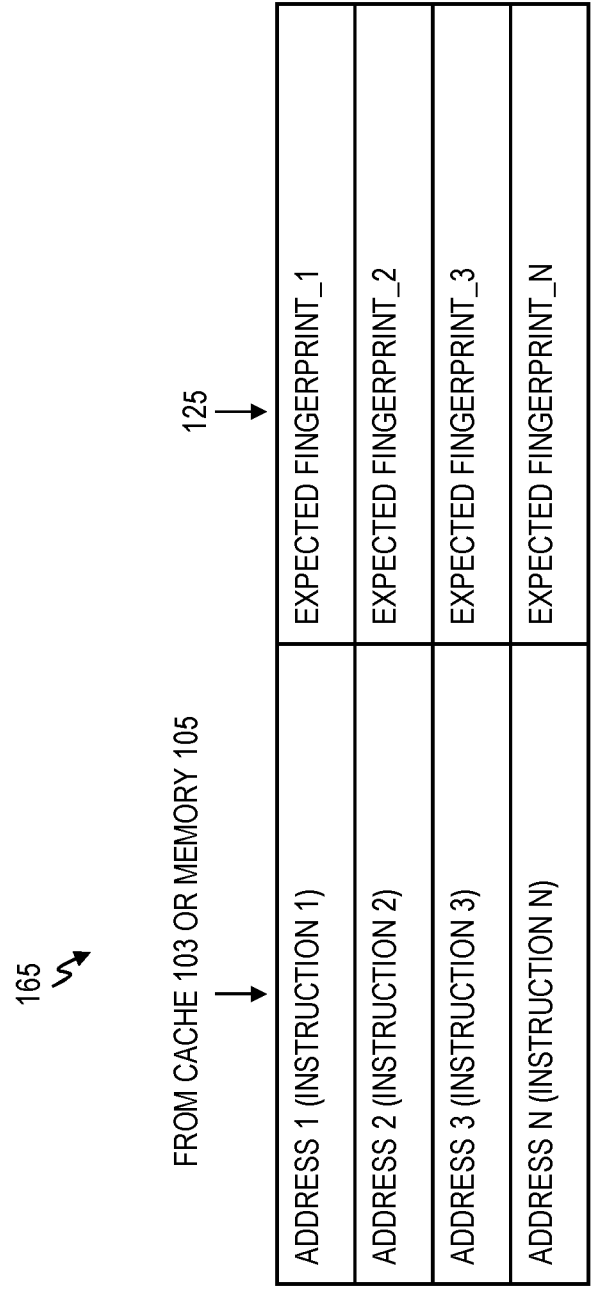
FIG. 4 depicts an example fingerprint table according to an embodiment

FIG. 4 depicts an example fingerprint table 165 utilized with one or more expected fingerprints 125 according to an embodiment. In row 1, the fingerprint table 165 may have address 1 (corresponding to an arbitrary instruction (i.e. "instruction 1) in memory 105) in the first column and the expected fingerprint_1 125, to be checked for at instruction 1, in the second column. Similarly, in row 2, the fingerprint table 165 may have address 2 (corresponding to instruction 2 in memory 105) in the first column and the expected fingerprint_2 125 in the second column, and so on.

The fingerprint circuit 110 is configured to compare the actual fingerprint in the actual fingerprint register 104 with the expected fingerprint 125 whenever the instruction (e.g., instruction 1, instruction 2, instruction, 3 and so forth) at one of the addresses (e.g., address 1, address 2, address 3, and so forth) in the fingerprint table 165 is executed by the processor 101. When a match is found between the value in the actual fingerprint register 104 and the expected fingerprint 125, the fingerprint circuit 110 is configured to determine that a malfunction has occurred and issue a lightweight interrupt to application 107.

Table 165 may also have multiple entries for a given address, where recognition of any of the expected fingerprints at that address indicates a malfunction. Similarly, table 165 may have multiple entries for a given instruction, where a malfunction is indicated only when none of the expected fingerprints exist at that address.

Some embodiments that use fingerprints based on sequential behavior (i.e., data cache hit/miss sequences) recognize a "fuzzy" match with an expected fingerprint by determining if the hamming distance between the existing and expected fingerprints is less than a certain value. If the hamming distance between the expected and actual fingerprints (i.e., the actual value in the actual fingerprint register 104 and the corresponding expected fingerprint 125) is greater than a threshold value, a lightweight interrupt such as the EBB is caused.

For example, the expected fingerprint 125 of a nested 8 iteration loop may be a sequence of data cache hit and misses, where a "1" indicates a data cache hit and a "0" indicates a miss, such as the following.

1111111101111111110111111110

If a sudden load is placed on another thread sharing the cache 103 and/or if the cache 103 begins to malfunction, however, the following sequence, which indicates an excessive number misses in the loop, may occur and be recognized by the fingerprint circuit 110.

1111000101010001110101000 1010

When the actual and expected fingerprints differ by so large an amount to cause the hamming distance between the actual and expected fingerprints 125 to go above a threshold, the fingerprint circuit 110 is configured to cause a lightweight interrupt to application 107. The lightweight interrupt occurs (immediately) when the fingerprint is recognized. Since the application 107 is alerted by an EBB at the time the fingerprint is recognized, the EBB handler can access table 165 to determine the type of fingerprint that was recognized. This immediate access to information about the type of fingerprint and thus the corresponding malfunction are beneficial in identifying specific malfunctions quickly. Without such immediate and specific information from embodiments, state-of-the-art run-time software would need to use performance monitor counters to identify the type of problem, which is a time-consuming and inexact procedure. Also, since the information provided by the performance monitor counters is not as detailed as that given by the fingerprint 125 (footprint) and does not contain any information about exactly when the malfunction was indicated, embodiments significantly shorten the time required to determine the specific correction that is needed.

Various embodiments include a fingerprint recognition function, or fingerprint module. There may be a respective fingerprint recognition function for each type of fingerprint being detected. Each type of fingerprint 125 and/or each combination of fingerprints 125 is indicative of a malfunction in the processor 101, software, and/or other hardware of the computer system 100. As detected by the fingerprint circuits 110, the following scenarios are examples of fingerprints 125 that may be indicative of a malfunction. It should be appreciated that the list is not intended to be all inclusive:

1) A branch prediction hit miss fingerprint that exists at the end of a loop, where the hamming distance between the expected and actual fingerprints is greater than half the length of the fingerprint. For example, an expected branch prediction hit/miss fingerprint at the end of an 8 iteration loop may be expected to be "1111111110111111110" representing branch prediction hits for branches returning to the beginning of the loop, followed by a miss for the branch that occurs after the last iteration. If the hamming distance between the actual fingerprint is more than, for example, 8, a malfunction is detected.

2) A data cache hit/miss sequences that exist at an instruction that reads an array. Such a sequence might be expected to have a data cache hit sequence of almost all hits if the data is stored sequentially. For this case, the expected fingerprint might simply be a string of "1"s representing 100% cache hits. If the hamming distance between the "all 1s" fingerprint and the actual fingerprint is over a threshold, then a cache malfunction is indicated. In this case, the hamming distance between the expected and actual fingerprint may simply equal to the number of "0s" in the actual fingerprint. When the number of 0s in the actual fingerprint exceeds a threshold, a malfunction is recognized.

3) A call signature fingerprint that exists at a call instruction. For example, there may be multiple call signatures (fingerprints) that may exist when a certain function is called, some of which indicate a particular malfunction. In this case those call signatures that indicate a malfunction are entered in the table 165 for the address of the call instruction. When a match occurs and one of the multiple call signatures exists, a malfunction is detected. A configuration such as this may be used to ensure that the function is called (only) under the conditions for which the program was designed. The existence of some other unexpected call signature indicates a malfunction since, unless the software encountered an unknown problem (e.g., failure of hardware, previously unknown software bug), a malfunction is immediately indicated.

4) A fingerprint consisting of a set of average performance metrics, such as average data cache hit rate, average branch direction hit rate, average branch target hit rate, rate of taken branches, percent instructions of a certain type etc., may be used to indicate a serious degradation of system performance. For example, when the expected values of all (or a threshold number of) metrics in the fingerprint are outside their expected values, a serious problem is likely occurring and a malfunction is indicated.

5) A CFAR fingerprint that exists at a call instruction. For example, there may be multiple values of the CFAR that may exist at certain points in a program, some of which indicate a particular malfunction. In this CFAR values that indicate a malfunction are entered in rows of table 165 for the address of the call instruction. When the value of the CFAR is equal to one of the expected fingerprints for a given address exists, then a malfunction is detected. A configuration such as this may be used to ensure that a program is following the execution paths for which it was designed. The existence of some other unexpected CFAR indicates a malfunction since, unless the software encountered an unknown problem (e.g. failure of hardware, previously unknown software bug), such a value would not be present.

FIG. 5 is a flow chart of a computer implemented method 500 for fingerprint-based processor malfunction detection via the fingerprint circuit 110 according to an embodiment.

At block 505, the fingerprint circuit(s) 110 is initialized.

At block 510, the fingerprint circuit 110 is configured to, in response to detecting execution an instruction containing a specified prefix or suffix, determine whether an expected fingerprint 125 is present in the output of the software (e.g., hypervisor 106, application 107, source code 108) that is currently executing on the processor 101 of the computer system 100, where the expected fingerprint 125 comprises a representation of a sequence of behavior that corresponds to a type of malfunction. For example, one fingerprint 125 may identify a cache malfunction. Another fingerprint 125 may identify a register malfunction. One fingerprint 125 may identify a main memory malfunction.

At block 515, the fingerprint circuit 110 is configured to, in response to determining that the expected fingerprint 125 is not present in the software currently executing on the processor 101, continue monitoring the software executing on the processor 101 to determine whether the expected fingerprint 125 is present.

At block 520, the fingerprint circuit 110 is configured to, in response to determining that the expected fingerprint 125 is present in the software executing on the processor 101, determine that a malfunction has occurred according to a type of the fingerprint 125 that is present.

Additionally, the match to the fingerprint 125 (and/or set of fingerprints) may be found (only) when the rate of a particular event or set of events (e.g. cache hit rate, branch prediction hit rate, etc.) exceeds a particular value or set of values.

Technical effects and benefits include improved performance of a computer processor. It should be appreciated that embodiments may continuously monitor one or more code fingerprints using code fingerprint detection apparatus. Fingerprint out of range detectors cause a lightweight interrupt when any of the observed fingerprints is outside the normal expected value. This enables the runtime environment to immediately take corrective action to resolve the problem based on the type of fingerprint that was out of range and the location in the code where the lightweight trap occurred. This significantly decreases the overhead of failure detection and resolution beyond what is possible in the state-of-the-art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for fingerprint-based processor malfunction detection, the method comprising:
determining whether a fingerprint is present in software that is currently executing on the processor of the computer system, the fingerprint comprising a representation of a sequence of behavior that occurs on the processor while the software is executing, wherein the fingerprint corresponds to a type of malfunction;
in response to determining that the fingerprint is not present in the software currently executing on the processor, continuing to monitor the software executing on the processor to determine whether the fingerprint is present; and
in response to determining that the fingerprint is present in the software executing on the processor, determining that the malfunction has occurred according to a type of the fingerprint that is present;
wherein determining whether the fingerprint is present in the software that is currently executing on the processor of the computer system occurs in response to identifying a predefined prefix in a prefix field of an instruction or identifying a predefined suffix in a suffix field of the instruction, the instruction comprising an opcode field and an operand field;
wherein the prefix field is an additional field added at a beginning of the instruction, such that the prefix field is before the opcode field and the operand field of the instruction; and
wherein the suffix field is an additional field added at an end of the instruction, such that the suffix field is after the opcode field and the operand field of the instruction.

2. The method of claim 1, further in response to the predefined prefix or the predefined suffix being identified, comparing a value in a fingerprint register to the fingerprint in order to determine whether the fingerprint is present in the fingerprint register.

3. The method claim 1, wherein identifying the predefined prefix or the predefined suffix causes output of the software currently executing on the processor to be placed into a fingerprint register, such that a value in the fingerprint register is compared to the fingerprint in order to determine whether the fingerprint is present in the fingerprint register.

4. The method of claim 1, wherein determining whether the fingerprint is present in the software that is currently executing on the processor of the computer system occurs in response to one or more instruction addresses of the software currently matching one or more predefined instruction addresses.

5. The method of claim 4, further comprising in response to the one or more instruction addresses of the software matching the one or more predefined instruction addresses, comparing a value in a fingerprint register to the fingerprint in order to determine whether the fingerprint is present in the fingerprint register.

6. The method of claim 5, wherein comparing the value in the fingerprint register to the fingerprint occurs each time any of the one or more predefined instruction addresses is found to match any one of the one or more instruction addresses of the software.

7. A computer program product for implementing fingerprint-based processor malfunction detection, the computer program product comprising:
   a computer readable storage medium having program instructions embodied therewith, the program instructions readable by a processing circuit to cause the processing circuit to perform a method comprising:
   determining whether a fingerprint is present in software that is currently executing on the processor of the computer system, the fingerprint comprising a representation of a sequence of behavior that occurs on the processor while the software is executing, wherein the fingerprint corresponds to a type of malfunction;
   in response to determining that the fingerprint is not present in the software currently executing on the processor, continuing to monitor the software executing on the processor to determine whether the fingerprint is present; and
   in response to determining that the fingerprint is present in the software executing on the processor, determining that the malfunction has occurred according to the type of the fingerprint that is present;
   wherein determining whether the fingerprint is present in the software that is currently executing on the processor of the computer system occurs in response to identifying a predefined prefix in a prefix field of an instruction or identifying a predefined suffix in a suffix field of the instruction, the instruction comprising an opcode field and an operand field;
   wherein the prefix field is an additional field added at a beginning of the instruction, such that the prefix field is before the opcode field and the operand field of the instruction; and
   wherein the suffix field is an additional field added at an end of the instruction, such that the suffix field is after the opcode field and the operand field of the instruction.

8. The computer program product of claim 7, further in response to the predefined prefix or the predefined suffix being identified, comparing a value in a fingerprint register to the fingerprint in order to determine whether the fingerprint is present in the fingerprint register.

9. The computer program product claim 7, wherein identifying the predefined prefix or the predefined suffix causes output of the software currently executing on the processor to be placed into a fingerprint register, such that a value in the fingerprint register is compared to the fingerprint in order to determine whether the fingerprint is present in the fingerprint register.

10. The computer program product of claim 7, wherein determining whether the fingerprint is present in the software that is currently executing on the processor of the computer system occurs in response to one or more instruction addresses of the software currently matching one or more predefined instruction addresses.

11. The computer program product of claim 10, further comprising in response to the one or more instruction addresses of the software matching the one or more predefined instruction addresses, comparing a value in a fingerprint register to the fingerprint in order to determine whether the fingerprint is present in the fingerprint register.

12. The computer program product of claim 11, wherein comparing the value in the fingerprint register to the fingerprint occurs each time any of the one or more predefined instruction addresses is found to match any one of the one or more instruction addresses of the software.

13. A computer system for fingerprint-based processor malfunction detection, the system comprising:
   a memory; and
   a processor, communicatively coupled to the memory, the computer system configured to perform a method comprising:
   determining whether a fingerprint is present in software that is currently executing on the processor of the computer system, the fingerprint comprising a representation of a sequence of behavior that occurs on the processor while the software is executing, wherein the fingerprint corresponds to a type of malfunction;
   in response to determining that the fingerprint is not present in the software currently executing on the processor, continuing to monitor the software executing on the processor to determine whether the fingerprint is present; and
   in response to determining that the fingerprint is present in the software executing on the processor, determining that the malfunction has occurred according to the type of the fingerprint that is present;
   wherein determining whether the fingerprint is present in the software that is currently executing on the processor of the computer system occurs in response to identifying a predefined prefix in a prefix field of an instruction or identifying a predefined suffix in a suffix field of the instruction, the instruction comprising an opcode field and an operand field;
   wherein the prefix field is an additional field added at a beginning of the instruction, such that the prefix field is before the opcode field and the operand field of the instruction; and
   wherein the suffix field is an additional field added at an end of the instruction, such that the suffix field is after the opcode field and the operand field of the instruction.

14. The system of claim 13, further, in response to the predefined prefix or the predefined suffix being identified, comparing a value in a fingerprint register to the fingerprint in order to determine whether the fingerprint is present in the fingerprint register.

15. The system of claim 13, wherein identifying the predefined prefix or the predefined suffix causes output of the software currently executing on the processor to be placed into a fingerprint register, such that a value in the fingerprint register is compared to the fingerprint in order to determine whether the fingerprint is present in the fingerprint register.

16. The system of claim 13, wherein determining whether the fingerprint is present in the software that is currently executing on the processor of the computer system occurs in response to one or more instruction addresses of the software currently matching one or more predefined instruction addresses.

17. The system of claim 16, further comprising, in response to the one or more instruction addresses of the software matching the one or more predefined instruction addresses, comparing a value in a fingerprint register to the fingerprint in order to determine whether the fingerprint is present in the fingerprint register.

* * * * *